(12) United States Patent
Nakamura et al.

(10) Patent No.: US 6,420,000 B1
(45) Date of Patent: Jul. 16, 2002

(54) LIQUID CRYSTAL DEVICE AND DRIVING METHOD FOR THE DEVICE

(75) Inventors: Shinichi Nakamura, Isehara; Masahiro Terada, Hadano; Takeshi Togano, Chigasaki; Yasushi Shimizu, Atsugi, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/534,448

(22) Filed: Mar. 24, 2000

(30) Foreign Application Priority Data

Mar. 25, 1999 (JP) ............................................ 11-082399

(51) Int. Cl.$^7$ ....................... C09K 19/02; G02F 1/1333; G02F 1/1343
(52) U.S. Cl. ............................ 428/1.1; 349/33; 349/76; 349/168; 349/172; 349/184
(58) Field of Search ...................... 252/294.01, 294.61; 349/33, 76, 168, 184, 172; 428/1.1

(56) References Cited

U.S. PATENT DOCUMENTS

| | | | |
|---|---|---|---|
| 4,367,924 A | 1/1983 | Clark et al. | 350/334 |
| 5,599,479 A | 2/1997 | Shinjo et al. | 252/299.61 |
| 5,629,788 A | 5/1997 | Mori et al. | 349/172 |
| 5,709,819 A | 1/1998 | Yamashita et al. | 252/299.61 |
| 5,733,475 A | 3/1998 | Yamashita et al. | 252/299.61 |
| 5,744,059 A | 4/1998 | Yamashita et al. | 252/299.61 |
| 5,830,386 A | 11/1998 | Nohira et al. | 252/299.61 |
| 5,943,035 A * | 8/1999 | Katakura | 345/97 |

FOREIGN PATENT DOCUMENTS

EP 1079363 * 2/2001
JP 56-107216 8/1981

OTHER PUBLICATIONS

Applied Physics Letters, vol. 19, No. 4, Feb. 1971, pp. 127–128.
Marc D. Radcliffe, 3M Company, P–46, pp. 169–170, 1993.

* cited by examiner

Primary Examiner—Shean C. Wu

(57) ABSTRACT

A liquid crystal device is constituted by a chiral smectic liquid crystal to form a plurality of pixels. The chiral smectic liquid crystal has a temperature-dependent tilt angle characteristic satisfying the following relationship:

$$H_{10} - H_1 \leq 4.0 \text{ degrees},$$

wherein $H_{10}$ denotes a tilt angle at a temperature which is 10° C. lower than an upper limit temperature of chiral smectic C phase and $H_1$ denotes a tilt angle at a temperature which is 1° C. lower than the upper limit temperature. The liquid crystal is aligned to provide an average molecular axis to be placed in a monostable alignment state under no voltage application, is tilted from the monostable alignment state in one direction when supplied with a voltage of a first polarity at a tilting angle which varies depending on magnitude of the supplied voltage, and is tilted from the monostable alignment state in the other direction when supplied with a voltage of a second polarity opposite to the first polarity at a tilting angle, said tilting angles providing maximum tilting angles formed under application of the voltages of the first and second polarities, respectively, different from each other, and one of said tilting angles continuously changing depending on magnitude of the supplied voltage of the first polarity or the second polarity.

11 Claims, 6 Drawing Sheets

LIQUID CRYSTAL DEVICE AND DRIVING METHOD FOR THE DEVICE

FIELD OF THE INVENTION AND RELATED ART

The present invention relates to a liquid crystal device for use in flat-panel displays, projection displays, printers, etc., and a driving method for the liquid crystal device.

Heretofore, various liquid crystal devices (panels) utilizing a liquid crystal for effecting optical switching have been proposed.

As a type of a nematic liquid crystal display device, there has been known an active matrix-type liquid crystal device wherein each pixel is provided with an active element (e.g., a thin film transistor (TFT)).

As a nematic liquid crystal material used for such an active matrix-type liquid crystal device using a TFT, there has been presently widely used a twisted nematic (TN) liquid crystal as disclosed by M. Schadt and W. Helfrich, "Applied Physics Letters", Vol. 18, No. 4 (Feb. 17, 1971), pp. 127–128.

In recent years, there has been proposed a liquid crystal device of In-Plain Switching mode utilizing an electric field applied in a longitudinal direction of the device, thus improving a viewing angle characteristic compared with TN-mode liquid crystal displays. Further, a liquid crystal device of a super twisted nematic (STN) mode without using the active element (TFT etc.) has also been proposed.

In any mode however, the resultant nematic liquid crystal display device has encountered a problem of a slow response time of several ten milliseconds or above.

In order to solve the above-mentioned difficulties of the conventional types of nematic liquid crystal devices, a liquid crystal device using a liquid crystal exhibiting bistability ("SSFLC", Surface Stabilized FLC), has been proposed by Clark and Lagerwall (Japanese Laid-Open Patent Application (JP-A) 56-107216, U.S. Pat. No. 4,367,924). As the liquid crystal exhibiting bistability, a chiral smectic liquid crystal or a ferroelectric liquid crystal (FLC) having chiral smectic C phase (SmC*) is generally used. Such a chiral smectic (ferroelectric) liquid crystal has a very quick response speed because it causes inversion switching of liquid crystal molecules by the action of an applied electric field on spontaneous polarizations of their liquid crystal molecules. In addition, the chiral smectic liquid crystal develops bistable states showing a memory characteristic and further has an excellent viewing angle characteristic. Accordingly, the chiral smectic liquid crystal is considered to be suitable for constituting a display device or a light valve of a high speed, a high resolution and a large area.

In recent years, as another liquid crystal material, an antiferroelectric liquid crystal showing tristability (tristable states) has caught attention. Similarly as in the ferroelectric liquid crystal, the antiferroelectric liquid crystal causes molecular inversion switching based on the action of an applied electric field on its spontaneous polarization, thus providing a very high-speed responsiveness. This type of the liquid crystal material has a molecular alignment (orientation) structure wherein liquid crystal molecules cancel or counterbalance their spontaneous polarizations each other under no electric field application, thus having no spontaneous polarization in the absence of the electric field.

In the case of using the chiral smectic liquid crystals (ferroelectric and antiferroelectric liquid crystals), similarly as in the case of the above-mentioned nematic liquid crystals, a larger contrast is required of resultant display images.

Further, in the case of the above-mentioned device (cell) using the chiral smectic liquid crystal, it has been difficult to effect a gradation display due to its display principle utilizing bistability.

In recent years, in order to allow a mode of controlling various gradation levels, there have been proposed liquid crystal devices using a specific chiral smectic liquid crystal, such as a ferroelectric liquid crystal of a short pitch-type, a polymer-stabilized ferroelectric liquid crystal or a threshold-less anti-ferroelectric liquid crystal. However, these devices have not been put into practical use sufficiently.

On the other hand, with respect to motion picture image qualities, it has been clarified that the motion picture image qualities are improved by providing a non-image display period between a still image display period and a subsequent still image display period when the above-mentioned conventional liquid crystal device is used for displaying motion picture images by sequentially rewriting the still images (a described in, e.g., "Shingaku Giho" (Technical Report of IEICD), EID 96-4 (1996), p. 16).

However, in the conventional nematic (display) mode, the response speed of a liquid crystal is insufficient, thus failing to be applied to the above motion picture display schemes. Further, in the case of using the chiral smectic liquid crystal (such as, a ferroelectric liquid crystal of a short pitch-type, a polymer-stabilized type or a threshold-less antiferroelectric liquid crystal), the resultant liquid crystal device is accompanied with difficulties, such as complicated driving method and peripheral circuits, thus leading to an increase in production cost.

SUMMARY OF THE INVENTION

In view of the above-mentioned problems, an object of the present invention is to provide a liquid crystal device capable of preventing a lowering in contrast while keeping a good gradation display performance.

Another object of the present invention is to provide a method for driving the liquid crystal device.

According to the present invention, there is provided a liquid crystal device, comprising:

a chiral smectic liquid crystal, and a pair of substrates having thereon electrodes for applying a voltage to the chiral smectic liquid crystal and disposed to sandwich the chiral smectic liquid crystal to form a plurality of pixels, wherein the chiral smectic liquid crystal has a temperature-dependent tilt angle characteristic satisfying the following relationship:

$$\textcircled{H}_{10} - \textcircled{H}_1 \leq 4.0 \text{ degrees},$$

wherein $\textcircled{H}_{10}$ denotes a tilt angle at a temperature which is 10° C. lower than an upper limit temperature of chiral smectic C phase and $\textcircled{H}_1$ denotes a tilt angle at a temperature which is 1° C. lower than the upper limit temperature, and the liquid crystal has an alignment characteristic such that the liquid crystal is aligned to provide an average molecular axis to be placed in a monostable alignment state under no voltage application, is tilted from the monostable alignment state in one direction when supplied with a voltage of a first polarity at a tilting angle which varies depending on magnitude of the supplied voltage, and is tilted from the monostable alignment state in the other direction when supplied with a voltage of a second polarity opposite to the first polarity at a tilting angle, the tilting angles providing maximum tilting angles formed under application of the voltages of the first and second polarities, respectively, different from each other, and one of the tilting angles continuously changing depending on magnitude of the supplied voltage of the first polarity or the second polarity.

According to the present invention, there is also provided a method of driving a liquid crystal device, comprising:

applying a voltage corresponding to a gradational display level to the chiral smectic liquid crystal.

According to the present invention, there is further provided a method of driving a liquid crystal device, comprising:

driving one frame period into a plurality of field periods, displaying a higher luminance image in at least one field period and a lower luminance image in at least one field period.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Hereinbelow, some preferred embodiments of the liquid crystal device and the driving method therefor according to the present invention will be described specifically with reference to FIGS. 1–7B.

Figure 1:
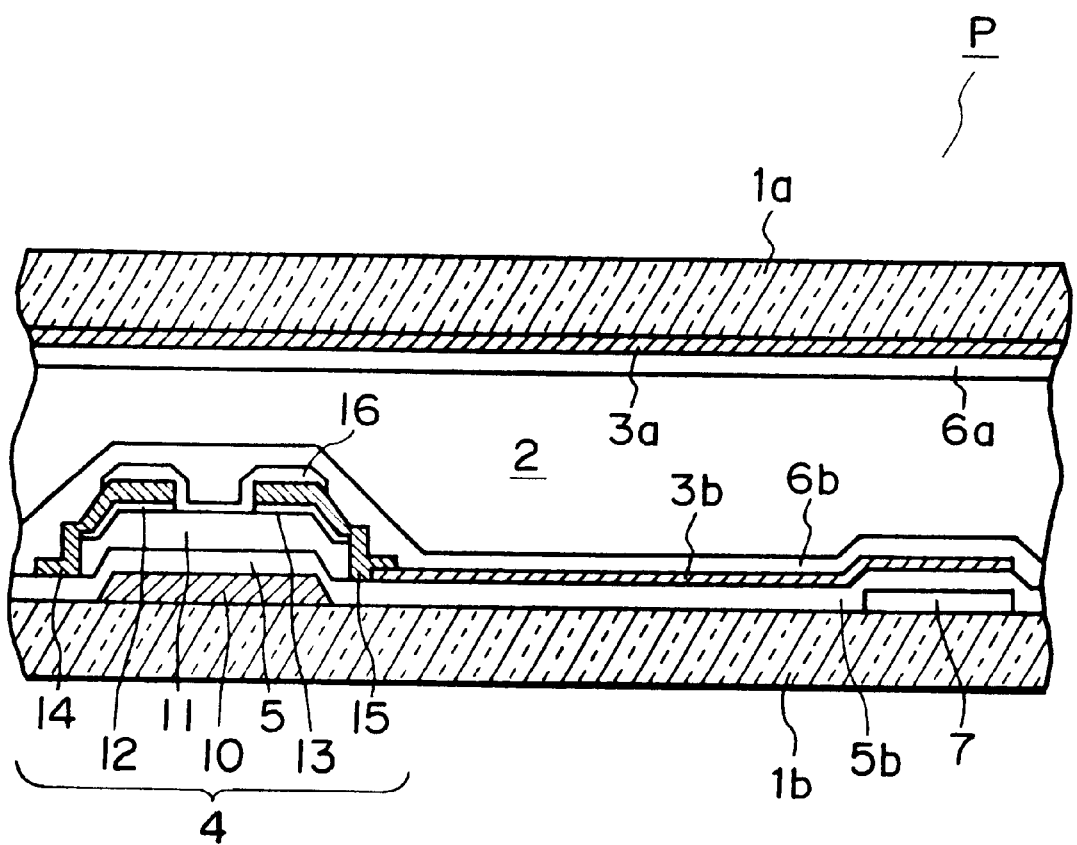
FIGS. 1 and 2 are schematic sectional views of embodiments of the liquid crystal devices according to the present invention of an active matrix-type and a single matrix-type, respectively.
Figure 2:
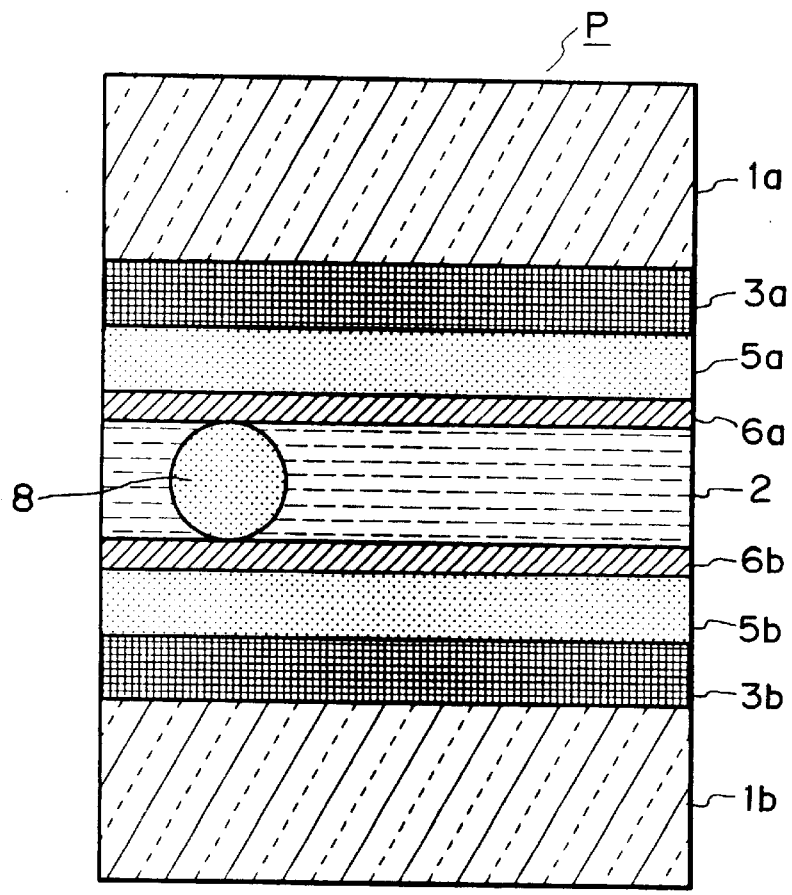

FIG. 1 is a schematic sectional view of an active matrix type liquid crystal device P of the present invention and FIG. 2 is a single matrix-type liquid crystal device P of the present invention.

Referring to these figures each of the liquid crystal devices P principally includes a pair of oppositely disposed substrates 1a and 1b provided with an electrode matrix comprising mutually intersecting electrodes 3a and 3b, and a chiral smectic liquid crystal 2 disposed between the substrates 1a and 1b to form a plurality of pixels each at an intersection of the electrodes 3a and 3b.

The chiral smectic liquid crystal 2 has a temperature-dependent tilt angle characteristic such that the chiral smectic liquid crystal 2 has a tilt angle $\textcircled{H}$ varying depending on a temperature in chiral smectic C phase, satisfying the followings relationship:

$$\textcircled{H}_{10} - \textcircled{H}_{1} \leq 4.0 \text{ degrees},$$

wherein $\textcircled{H}_{10}$ denotes a tilt angle at a temperature which is 10° C. lower than an upper limit temperature of the chiral smectic C phase (Tc, i.e., a phase transition temperature between a higher-temperature phase and chiral smectic liquid crystal C phase on temperature increase) and $\textcircled{H}_{1}$ denotes a tilt angle at a temperature which is 1° C. lower than Tc (Tc−1 (°C.)).

The chiral smectic liquid crystal 2 may preferably satisfy the following relationship:

$$\textcircled{H}_{30} - \textcircled{H}_{10} \leq 2.0 \text{ degrees},$$

wherein $\textcircled{H}_{30}$ denotes a tilt angle at Tc−30 (°C.) (a temperature lower than Tc by 30° C.).

The chiral smectic liquid crystal 2 may preferably be formulated as a liquid crystal composition.

The liquid crystal composition as the liquid crystal 2 used in the liquid crystal device P may preferably comprise at least two compounds each represented by the following formulas (1), (2), (3) and (4).

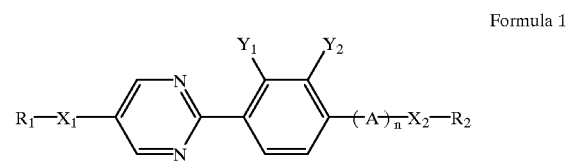

Formula 1 wherein A is

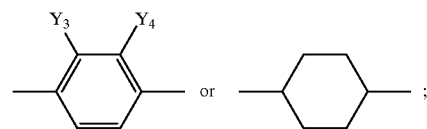

or

R1 and R2 are independently a linear or branched alkyl group having 1–2 carbon atoms optionally having a substituent; X1 and X2 are independently a single bond O, COO or OOC; Y1, Y2, Y3 and Y4 are independently H or F; and n is 0 or 1.

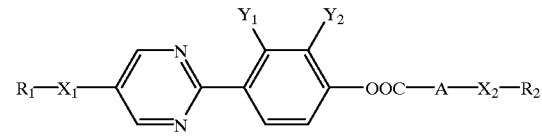

Formula (2)

wherein A is

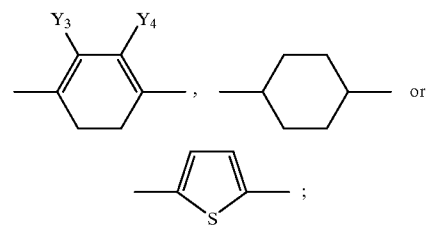

R1 and R2 are independently a linear or branched alkyl group having 1–20 carbon atoms optionally having a substituent; X1 and X2 are independently a single bond O, COO or OOC; and Y1, Y2, Y3 and Y4 are independently H or F.

Formula (3)

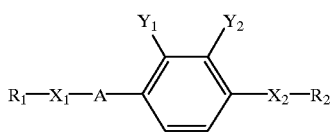

wherein A:

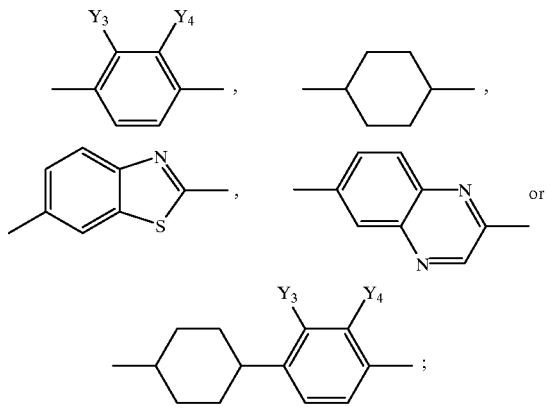

R1 and R2 are independently a linear or branched alkyl group having 1–20 carbon atoms optionally having a substituent X1 and X2 are independently a single bond O, COO or OOC; and Y1, Y2, Y3 and Y4 are independently H or F.

Formula (4)

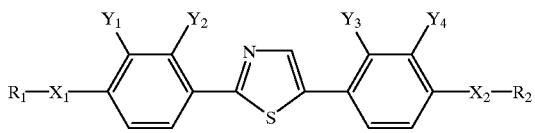

wherein R1 and R2 are independently a linear or branched alkyl group having 1–2 carbon atoms optionally having a substituent; X1 and X2 are independently a single bond, O, COO or OOC; and Y1, Y2, Y3 and Y4 are independently H or F.

Among these compounds of the formulas (1)–(4), it is preferred to use a compound represented by the formula (I) shown below since the compound readily assumes a phase transition series on temperature decrease of nematic phase (N)-smectic C phase (SmC).

(I)

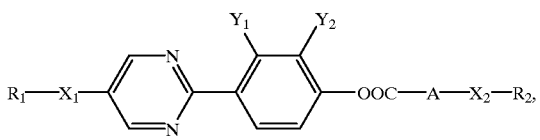

wherein A denotes — — or —$_S$—; $R_1$ and $R_2$ are independently a linear or branched alkyl group having 1–20 carbon atoms optionally having a substituent; $X_1$ and $X_2$ are independently a single bond, O, COO or OOC; and $Y_1$ and $Y_2$ are independently H or F.

When at least one species of the compound of the formula (I) is used as a component of the chiral smectic liquid crystal (composition) 2, the chiral smectic liquid crystal 2 assumes a phase transition series of isotropic liquid phase (Iso)-Cholesteric phase (Ch)-chiral smectic C phase (SmC*) or Iso-SmC* on temperature decrease.

In the above formula (I) in order not to considerably increase a viscosity of the resultant liquid crystal composition, a combination comprising a linear alkyl group having 1–16 carbon atoms for $R_1$ and $R_2$ a single bond or O for $X_1$ nd $X_2$, and H or F for $Y_1$ and $Y_2$ may particularly preferably be used.

In order to satisfy the above-mentioned temperature-dependent tilt angle characteristic, the chiral smectic liquid crystal composition 2 may preferably contain at least 20 wt. % of the compound of the formula (I), more preferably at least 30 wt. % thereof for well retaining the temperature-dependent tilt angle characteristic at high temperature range in chiral smectic C phase.

The chiral smectic liquid crystal 2 used in the liquid crystal device P may preferably have alignment characteristic such that an average molecular axis of liquid crystal molecules is monostabilized under no voltage application and, under application of voltages of one polarity is tilted from the monostabilized position in one direction and, under application position in one direction and, under application of voltages of the other polarity (opposite to the above one polarity), is tilted from the monostabilized position in the other direction (opposite to the above one direction).

When the voltages of one polarity and the other polarity are applied to the chiral smectic liquid crystal 2, a tilting angle based on the monostabilized position of the average molecular axis of liquid crystal molecules varies continuously depending on the magnitude of the voltage applied to the liquid crystal 2. As a result a light quantity emitted from the liquid crystal device P also changes its value depending on the magnitude of the applied voltage, thus allowing a gradational display in combination with a drive circuit (means) for supplying gradation signals to the liquid crystal device P connected thereto.

In this instance, a maximum value of the tilting angle (maximum tilting angle) in the case of one polarity-voltage application may preferably be different from that in the case of the other polarity-voltage application. As a result, a corresponding maximum emitting light quantity (first light quantity) in the case of polarity-voltage application is also different from that (second light quantity) in the case of the other polarity-voltage application.

The maximum tilting angle under one polarity-voltage application may preferably be larger than that under the other polarity-voltage application. As a result, a corresponding first light quantity is larger than a corresponding second light quantity.

It is also possible to provide an emitting light quantity (third light quantity) of substantially zero under no voltage application by appropriately arranging a pair of polarizers.

Figure 3:
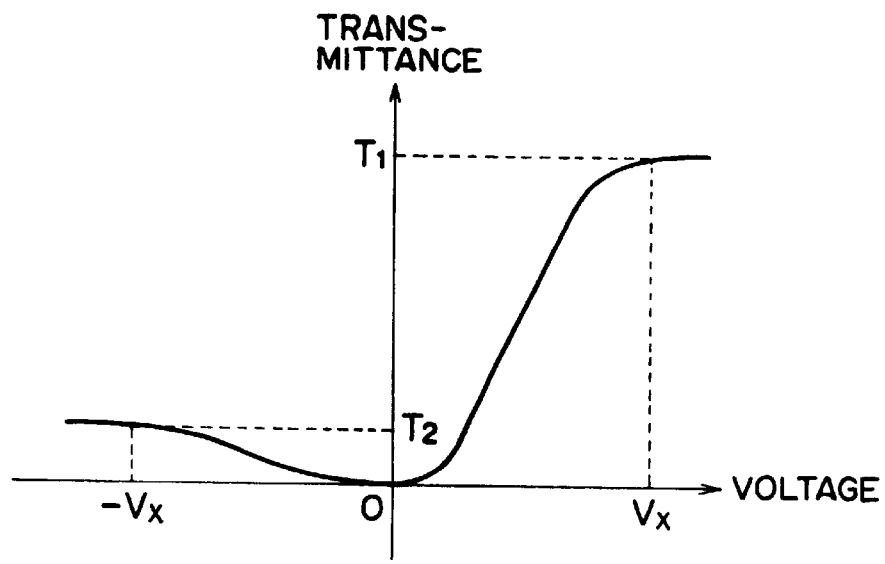
FIG. 3 is a graph showing an example of a V-T (voltage-transmittance) characteristic of a chiral smectic liquid crystal device used in the present invention.

FIG. 3 shows a voltage-transmittance (V-T) characteristic of such a chiral smectic liquid crystal 2 in the liquid crystal device P.

The chiral smectic liquid crystal 2 exhibiting the above-mentioned characteristics may be prepared by using a liquid crystal material which assumes a phase transition series of Iso.-Ch-SmC* or Iso.-SmC* on temperature decrease and has a smectic layer normal direction substantially aligned in one direction and loses its memory characteristic in SmC*.

In order to realize a non-memory state of the liquid crystal 2, it is possible to adopt the following methods (i) to (iv):

(i) a method wherein the liquid crystal 2 disposed between a pair of substrates is supplied with a DC voltage of a positive polarity or negative polarity, (ii) a method wherein oppositely disposed two alignment control films contacting the liquid crystal 2 are formed of different materials, (iii) a method wherein oppositely disposed two alignment control films contacting the liquid crystal 2 are subjected to different treatments in terms of film-forming conditions, rubbing conditions (e.g., rubbing strength), curing conditions (e.g., UV irradiation strength and time), etc., and (iv) a method wherein undercoating layers different in material and/or thickness are formed under oppositely disposed two alignment control films contacting the liquid crystal 2, respectively.

The liquid crystal 2 may preferably be prepared by appropriately blending a plurality of liquid crystal materials exhibiting, e.g., the above-described characteristics selected from hydrocarbon-type liquid crystal materials containing a biphenyl, phenyl-cyclohexane ester or phenyl-pyrimidine skeleton, naphthalene-type liquid crystal materials and fluorine-containing liquid crystal materials.

When the liquid crystal device P as described above has a single matrix cell structure or an active matrix cell structure wherein one of the electrode 3b (as shown in FIG. 1) is electrically connected with an active (switching) element 4, such as a TFT (thin film transistor) or an MIM (metal-insulator-metal) for each pixel. In the active matrix cell structure, electrode 3b provided with the plurality of the active elements 4 may be arranged in a dot pattern including dots each corresponding to one pixel and the other electrode 3a may be formed in a single common electrode pattern or a prescribed pattern divided into a plurality of portions.

The liquid crystal device P of the present invention may be formed in a color liquid crystal device by providing one of the substrates 1a and 1b with a color filter comprising color filter segments of at least red (R), green (G) and blue (B).

In the present invention, the liquid crystal device P may be applicable to various liquid crystal devices including: a liquid crystal device of a transmission-type wherein a pair of transparent substrates 1a and 1b is sandwiched between a pair of cross-nicol polarizers to optically modulate incident light (e.g., from a backlight) through one of the substrate 1a and 1b to be passed through the other substrate, and a liquid crystal device of a reflection-type wherein at least one of a pair of substrates 1a and 1b is provided with a polarizer to optically modulate incident light and reflected light and pass the light through the substrate on the light incident side. The reflection-type liquid crystal device may, e.g., be prepared by providing a reflection plate to either one of the substrates 81a and 1b or forming of a reflective material one of the substrates per se or a reflecting member provided thereto.

Referring again to FIG. 2, each of the substrates 1a and 1b comprises a transparent material, such as glass or plastics, and is coated with, e.g., a plurality of stripe electrodes 3a (3b) of $In_2O_3$ or ITO (indium tin oxide) for applying a voltage to the liquid crystal 2. These electrodes 3b and 3b intersect each other to form a matrix electrode structure, thus providing a simple matrix-type liquid crystal device P.

On the electrodes 3a and 3b, the insulating films 5a and 5b, e.g., of $SiO_2$, $TiO_2$ or $Ta_2O_5$ having a function of preventing an occurrence of short circuit may be disposed, respectively, as desired.

On the insulating films 5a and 5b, the alignment control films 6a and 6b are disposed so as to control the alignment state of the liquid crystal 2 contacting the alignment control films 6a and 6b. At least one of (preferably both of) the alignment control films 6a and 6b is subjected to a uniaxial aligning treatment (e.g., rubbing). Such an alignment control film 6a (6b) may be prepared by forming a film of an organic material (such as polyimide, polyimideamide, polyamide or polyvinyl alcohol through wet coating with a solvent, followed by drying and rubbing in a prescribed direction or by forming a deposited film of an inorganic material through an oblique vapor deposition such that an oxide (e.g., SiO) or a nitride is vapor-deposited onto a substrate in an oblique direction with a prescribed angle to the substrate.

The alignment control films 6a and 6b may appropriately be controlled to provide liquid crystal molecules of the liquid crystal 2 with a prescribed pretilt angle α (an angle formed between the liquid crystal molecule and the alignment control film surface at the boundaries with the alignment control films) by changing the material and treating conditions (of the uniaxial aligning treatment).

In the case where both of the alignment control films 6a and 6b are subjected to the uniaxial aligning treatment (rubbing), the respective uniaxial aligning treatment (rubbing) directions may appropriately be set in a parallel relationship, an anti-parallel relationship or a crossed relationship providing a crossing angle of at most 45 degrees, depending on the liquid crystal material used.

The substrates 1a and 1b are disposed opposite to each other via the spacer 8 comprising e.g., silica beads for determining a distance (i.e., cell gap) therebetween, preferably in the range of 0.3–10 μm, in order to provide a uniform uniaxial aligning performance and such an alignment state that an average molecular axis of the liquid crystal molecules under no electric field application is substantially aligned with an average uniaxial aligning treatment axis (a bisector of two uniaxial aligning treatment axes) although the cell gap varies its optimum range and its upper limit depending on the liquid crystal material used. The cell gap may be set to a value which is at most half of a helical pitch of the chiral smectic liquid crystal 2 in a bulk state.

In addition to the spacer 8, it is also possible to disperse adhesive particles of a resin (e.g., epoxy resin) (not shown) between the substrates 1a and 1b in order to improve adhesiveness therebetween and an impact (shock) resistance of the liquid crystal device P.

The liquid crystal device P according to the present invention may be driven by applying a voltage to the chiral smectic liquid crystal 2 through the pair of electrodes 3a and 3b.

In the case of gradational display, a voltage corresponding to a desired gradational level for display may be applied to the liquid crystal 2 having the above-mentioned alignment characteristic such that the tilting angle continuously changes depending on the magnitude of the applied voltage.

Figure 6:
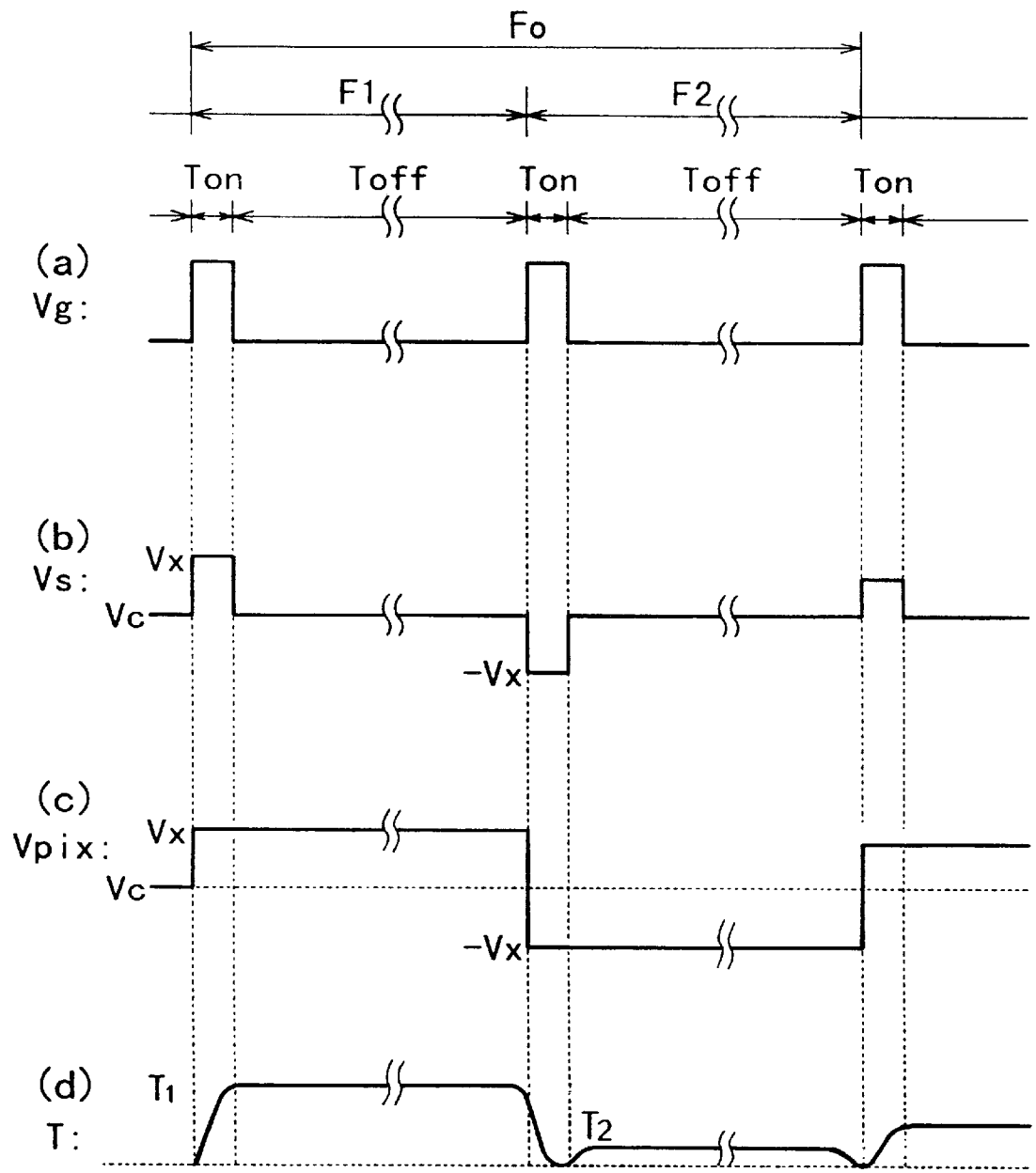
FIG. 6 shows drive waveform diagrams (at (a), (b) and (c)) for driving the active matrix-type liquid crystal device shown in FIG. 1 and a corresponding transmitted light quantity (at (d)).

In the case of motion picture display, as shown in FIG. 6, one frame period F0 is divided into a plurality of field periods (F1 and F2 in the case of FIG. 6). In at least one field period F1, a higher luminance image is displayed and in at least one field period F2, a lower luminance image is displayed. In this case, the magnitude of the applied voltage may be changed for each field period (F1 or F2) but may be identical for each field period in the case of using a chiral smectic liquid crystal providing a maximum tilting angle under application of one polarity voltage larger than that under application of the other polarity voltage. In the latter case, only the polarity of the applied voltage is changed for each field period (F1, F2). This driving scheme may particularly preferably be applicable to the liquid crystal device using a chiral smectic liquid crystal having the V-T characteristic as shown in FIG. 3, thus allowing gradational display and motion picture display including higher luminance display and lower luminance display in combination without changing the magnitude of the applied voltage.

Hereinbelow, such a driving method for the liquid crystal device of the present invention allowing gradational display in combination with motion picture display (higher luminance/lower luminance display) will be described with reference to FIGS. 1, 4, 5 and 6.

Figure 4:
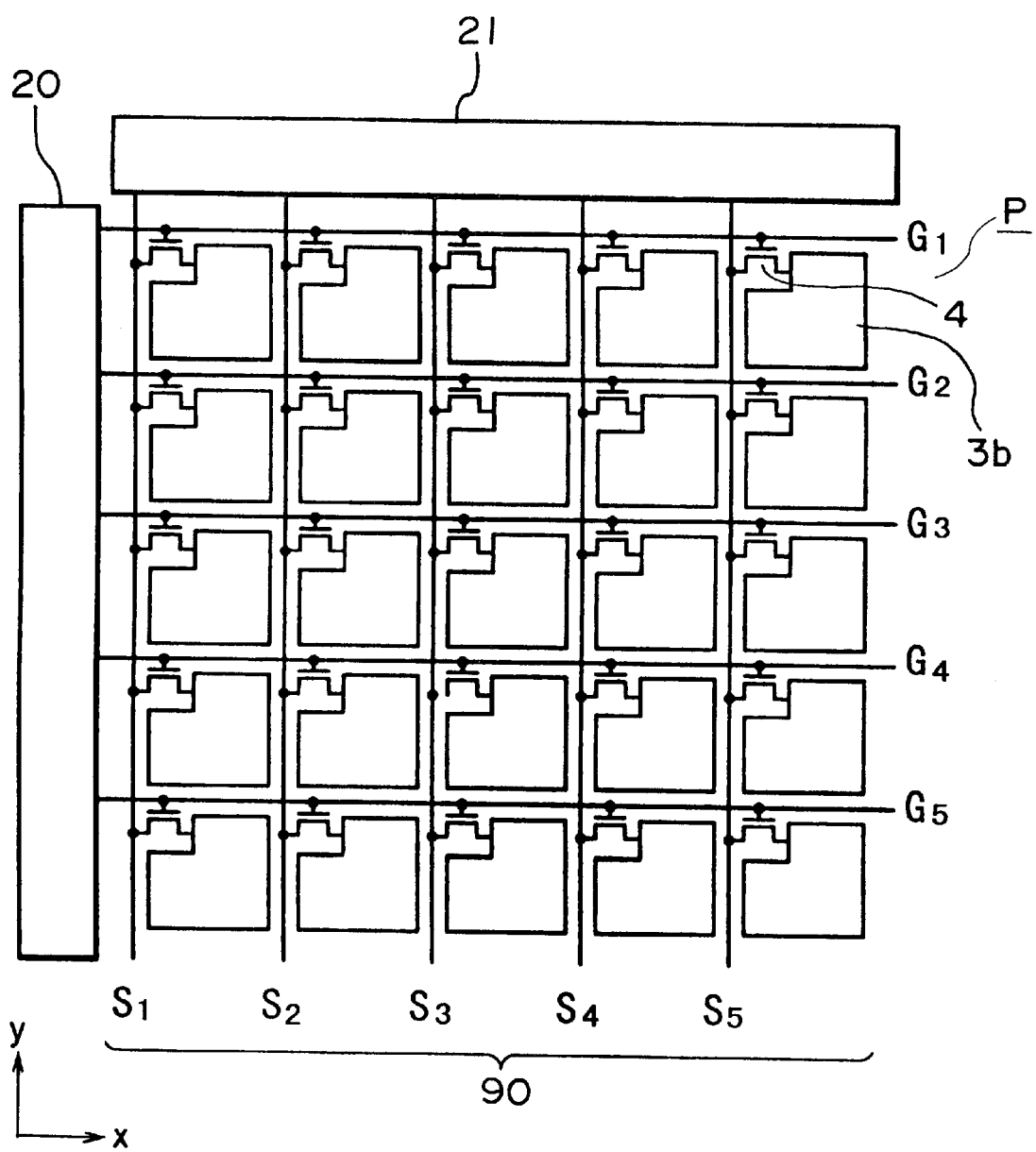
FIG. 4 is a schematic plan view of an embodiment of an active matrix-type liquid crystal device of the present invention in combination with drive circuits therefor.

FIG. 4 shows a schematic plan view of such a liquid crystal device P and a drive circuit (means) (20, 21) and principally illustrates a structure on the active matrix substrate side.

Referring to FIG. 4, a liquid crystal device (panel) P includes a structure such that gate lines (G1, G2, G3, G4, G5, ...) corresponding to scanning lines connected to a scanning signal driver 20 (drive means) and source lines (S1, S2, S3, S4, S5, ...) corresponding to data signal lines connected to a data signal driver 21 (drive means) are disposed in x-direction and y-direction, respectively, so as to intersect each other at right angles in an electrically isolated state, thus forming a plurality of pixels (5×5 in FIG. 4) each at intersection thereof. Each pixel is provided with a thin film transistor (TFT) 4 as an active (switching) element and a pixel electrode 3b (as an effective drive region). The active element may be a metal-insulator-metal (MIM) element. The gate lines (G1, G2, ...) are connected with gate electrodes (10 shown in FIG. 1) of the TFT 4, respectively, and the source lines (S1, S2, ...) are connected with source electrodes (14 shown in FIG. 1) of the TFT 4, respectively. The pixel electrodes 3b are connected with drain electrodes (15 shown in FIG. 1) of the TFT 4, respectively.

FIG. 1 shows a sectional structure of each pixel portion (corr. to 1 bit) in the panel structure shown in FIG. 4.

Referring to FIG. 1, a layer of a liquid crystal material 2 having a spontaneous polarization are sandwiched between an active matrix substrate or plate provided with a TFT 4 and a pixel electrode 3b and an opposing substrate or plate provided with a common electrode 3a, thus providing a liquid crystal capacitor (Clc shown in FIG. 5) of the liquid crystal layer 2.

In this embodiment, the active matrix substrate includes an amorphous silicon (a-Si) TFT as the TFT 4. The TFT may be of a poly crystalline-Si type, i.e., (p-Si) TFT.

The TFT 4 is formed on a substrate 1b of, e.g., glass and includes: a gate electrode 10 connected with the gate lines (G1, G2, ... shown in FIG. 4); an insulating film (gate insulating film) 5 (5b) of, e.g., silicon nitride (SiNx) formed on the gate electrode 10; an a-Si layer 11 formed on the insulating film 5 (5b); $n^+$ a-Si layers 12 and 13 formed on the a-Si layer 11 and spaced apart from each other; a source electrode 14 formed on the $n^+$ a-Si layer 12; a drain electrode 15 formed on the $n^+$ a-Si layer 13 and spaced apart from the source electrode 14; a channel protective film 16 partially covering the a-Si layer 11 and the source and drain electrodes 14 and 15. The source electrode 14 is connected with the source lines (S1, S2, ... shown in FIG. 4) and the drain electrode 15 is connected with the pixel electrode 3b (FIG. 4) of a transparent conductor film (e.g., ITO film).

Figure 5:
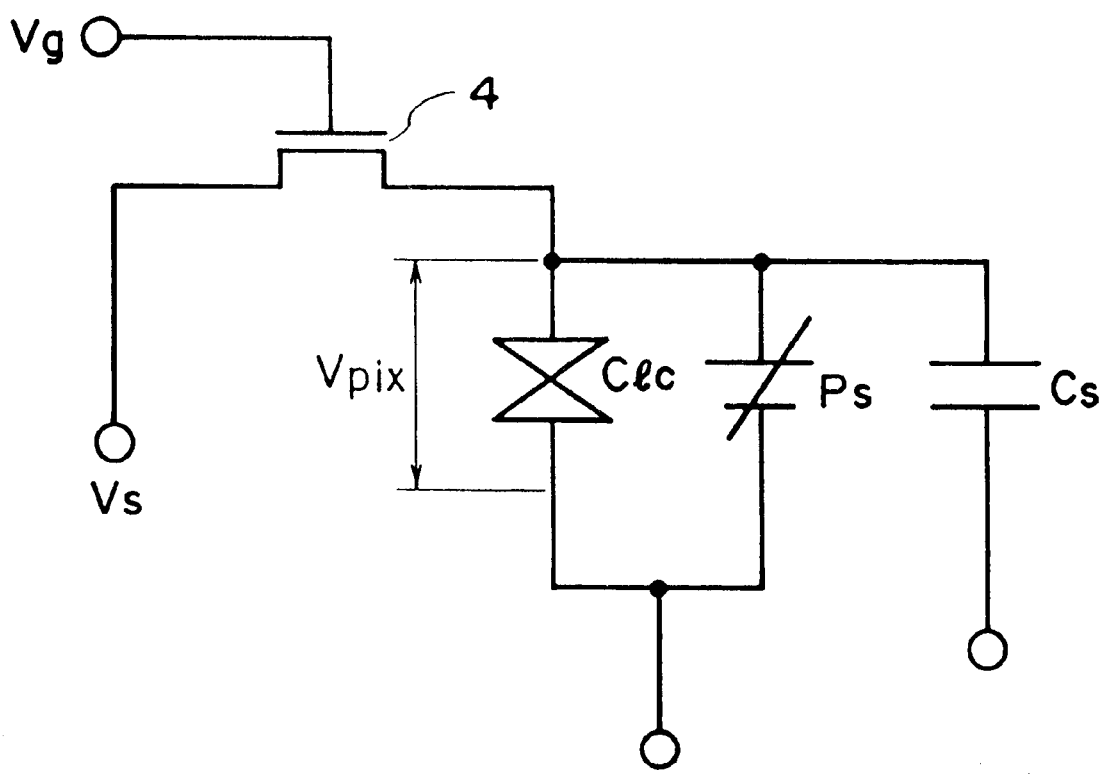
FIG. 5 shows an equivalent circuit of each pixel portion of the liquid crystal device shown in FIG. 4.

Further, on the glass substrate 1b, a structure constituting a holding or supplementary capacitor (Cs) as shown in FIG. 5 is formed by the pixel electrode 3b, a holding capacitor electrode 7 disposed on the substrate 1b, and a portion of the insulating film 5b sandwiched therebetween. The structure (holding capacitor) (Cs) is disposed in parallel with the liquid crystal layer 2. In the case where the holding capacitor electrode 7 has a large area, a resultant aperture or opening rate is decreased. In such a case, the holding capacitor electrode 7 is formed of a transparent conductor film (e.g., ITO film).

On the TFT 4 and the pixel electrode 3b of the active matrix substrate, as shown in FIG. 1, an alignment film 6b for controlling an alignment state of the liquid crystal 2. The alignment film 6b is subjected to a uniaxial aligning treatment (e.g., rubbing).

On the other hand, the opposing substrate includes a substrate (e.g., glass substrate) 1b; a common electrode 3a having a uniform thickness disposed on the entire substrate 1a; and an alignment film 6b having a uniform thickness, disposed on the common electrode 3a, for controlling an alignment state of the liquid crystal 2.

The above panel (cell) structure (liquid crystal device) including a plurality of the pixels each having the structure shown in FIG. 1 is sandwiched between a pair of polarizers (not shown) with polarizing axes intersecting each other at right angles.

The gap between the pair of substrates 1a and 1b is filled with the chiral smectic liquid crystal 2 which exhibits the above-mentioned V-T (optical response) characteristic shown in FIG. 3, thus constituting the liquid crystal capacitance Clc as shown in FIG. 5.

Next, an example of an ordinary active matrix driving method according to the present invention utilizing the liquid crystal device using the active matrix substrate (plate) and a chiral smectic liquid crystal having the characteristics as described above will be described with reference to FIG. 6.

FIG. 6 shows at (a) a voltage waveform of a gate voltage Vg applied to one gate line (e.g., G1 shown in FIG. 4) (as a scanning line) connected with each pixel, at (b) a voltage waveform of a source voltage Vs applied to one source line (e.g., S1 shown in FIG. 4, at (c) a waveform of a pixel voltage Vpix applied to a corresponding pixel (e.g., a pixel at an intersection of the gate line G1 and the source line S1), and at (d) a change in transmittance (transmitted light quantity) T at the pixel concerned. In this driving method, each frame period F0 is divided into two field periods F1 and F2.

In the liquid crystal device driven by the active matrix driving method, the gate lines G1, G2, ... shown in FIG. 4 are selected in a line-sequential manner in each of the field periods F1 and F2.

When one gate line (e.g., G1) is supplied with a gate voltage Vg in a selection period Ton (at (a) of FIG. 6), in synchronism therewith, a corresponding source line (e.g., S1) is supplied with a source voltage Vs (=Vx) based on a potential Vc of the common electrode 3a as a reference potential (at (b) of FIG. 6). As a result, a TFT 4 of a pixel concerned is turned "ON" by the application of the gate voltage Vg and the liquid crystal 2 at the pixel is supplied with the source voltage Vs through the TFT 4 and a pixel electrode 3b concerned, thus charging a liquid crystal capacitor Clc and a holding capacitor Cs.

In a non-selection period Toff other than the selection period Ton, the gate voltage Vg is applied to gate lines other than the above gate line G1, thus placing the TFT 4 in an "OFF" state. At that time, the charged liquid crystal capacitor Clc and holding capacitor Cs hold the electric charges stored therein (at (c) of FIG. 6).

As a result, the liquid crystal 2 is continuously supplied with the pixel voltage Vpix (=Vx) in the entire field period F1, thus retaining a substantially same transmittance T (=T1) through the field period F1 (at (d) of FIG. 6).

After the scanning (selection) of other gate lines is completed, i.e., the field period F1 is terminated, the gate line G1 is again supplied with the gate voltage Vg in a selection period Ton of a subsequent field period F2 (at (a)) and in synchronism therewith, the source line S1 is supplied with a source voltage Vs (=−Vx) having a polarity opposite to that (Vx) applied in the preceding field period F1 (at (b)). As a result, the source voltage Vs (=−Vx) is charged into the liquid crystal capacitor Clc and holding capacitor Cs and kept therein in a non-selection period Toff (at (c)).

Such an driving operation is repeated for each frame period F0 to effect re-writing of an image.

The liquid crystal 2 has the V-T characteristic as shown in FIG. 3, thus providing a sufficiently larger transmittance (transmitted light quantity) T1 in the first field period F1 where the positive-polarity source voltage Vx is applied and a considerably smaller transmittance T2 in the second field period F2 where the negative-polarity source voltage −Vx is applied, irrespective of the absolute value of the source voltage −Vx. The transmittance T2 is closer to zero but a non-zero value, thus ensuring a luminance of a human eye-sensible degree.

In the entire frame period F0, an average transmittance of T1 and T2 is obtained but bright and dark display states are alternately repeated for each field period (F1, F2). As a result, good image quality for motion picture display are obtained. Further, it is also possible to prevent a deterioration in the liquid crystal 2 due to the alternating application of the positive-polarity voltage Vx and the negative-polarity voltage −Vx.

The value of the positive-polarity voltage Vx may be determined based on the V-T characteristic of the liquid crystal 2 and an image data to be written in the pixel concerned (i.e., an optical state or display data to be obtained at the pixel). In this regard, the transmittance obtained through the entire one frame period F0 results in an average of T1 and T2 as described above and thus when the liquid crystal 2 has a V-T characteristic providing a very small transmittance T2, a value of the voltage Vx determining a transmittance T1 may preferably be set to a higher value in view of such a transmittance T2.

In the present invention, the liquid crystal 2 has the above-mentioned temperature-dependent tilt angle characteristic of: $\widehat{H}_{10}-\widehat{H}_1 \leq 4.0$ degrees, thereby retaining a high contrast. Further, the liquid crystal 2 satisfies also the relationship: $\widehat{H}_{30}-\widehat{H}_{10} \leq 2.0$ degrees, thereby to prevent a lowering in contrast.

The liquid crystal 2 used in the present invention has a chiral smectic phase providing a spontaneous polarization, thus exhibiting a higher response speed.

In the present invention, it is possible to effect a gradational image display by applying a voltage depending on a described gradational level to the liquid crystal having the above-mentioned alignment and V-T characteristic (such that the tilting angle leading to the transmittance changes continuously depending on the magnitude of the applied voltage).

Further, based on the above-mentioned gradational display operation such that each frame period (e.g., F0) is divided into a plurality of field periods (e.g., F1, F1, . . . ), and a higher luminance display is performed in at least one field period F1 and a lower luminance display is performed in at least one field period F2, image qualities for motion picture display are improved. In addition, a higher luminance is ensured compared with a conventional motion picture display scheme wherein a non-image display period is set between adjacent still image display periods. Further, the driving method of the present invention does not complicate the driving scheme and peripheral circuits, thus avoiding an increase in production cost.

Next, the reason why the tilt angles $\widehat{H}_1$, $\widehat{H}_{10}$ and $\widehat{H}_{30}$ correlate the resultant contrast will be described with reference to FIG. 7.

Figure 7A:
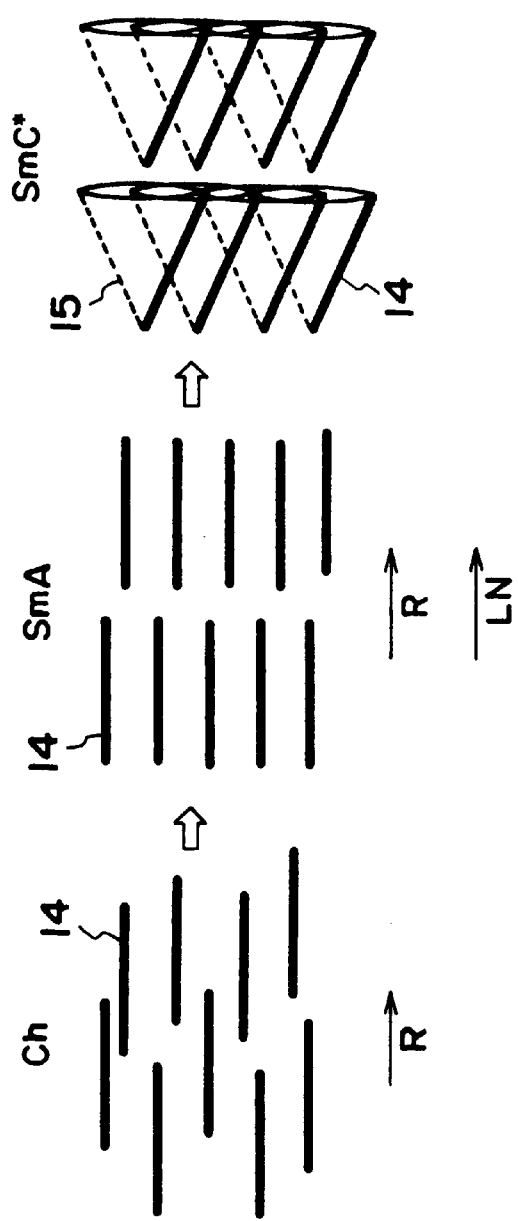
FIGS. 7A and 7B are illustrations of embodiments of smectic molecular layer formation for explaining a correlation of a tilt angle with a contrast.
Figure 7B:
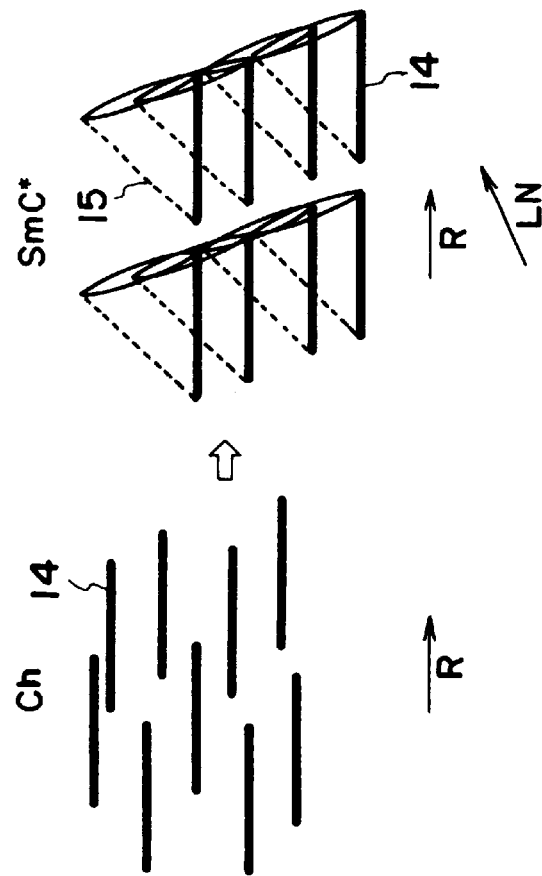

FIG. 7A shows a course (process) of formation of smectic layer structure of a liquid crystal material exhibiting a phase transition series on temperature decrease of at least Ch-SmA (smectic A phase)-SmC* and FIG. 7B shows a course of smectic layer structure formation of a liquid crystal material exhibiting at Ch-SmC* phase transition series on temperature decrease.

In these figures, an arrow R represents a direction of an average uniaxial aligning treatment axis (rubbing direction) and an arrow LN represents a direction of a normal to smectic layer (layer normal direction). Further, liquid crystal molecules 14 can move along with the wall surface of the virtual cone 15 at the time of voltage application thereto.

Herein, a direction of the "average uniaxial aligning treatment axis" means a direction of a uniaxial aligning treatment axis direction in the case where only one of the pair of substrates is subjected to a uniaxial aligning treatment or a direction of two parallel uniaxial aligning treatment axes in the case where both of the pair of substrates are subjected to a uniaxial aligning treatment so that their uniaxial aligning treatment axes are parallel to each other and in the same direction or opposite directions (parallel relationship or anti-parallel relationship). Further, in the case where both of the substrates are subjected to a uniaxial aligning treatment so that their uniaxial aligning treatment axes intersect each other at a crossing angle, the "average uniaxial aligning treatment axis" direction means a direction of a bisector of the uniaxial aligning treatment axes (a half of the crossing angle).

Referring to FIG. 7A, in the case of the liquid crystal material having the phase transition series including SmA (smectic A phase), the liquid crystal molecules 14 are oriented in SmA so that the (smectic) layer normal direction LN is aligned with the uniaxial aligning treatment direction R, thus forming a smectic layer structure. In SmC*, the liquid crystal molecules 14 are tilted from the layer normal direction LN and stabilized at a position in the vicinity of or slightly inside a side (edge) of the virtual cone 15.

On the other hand, in the case of the liquid crystal material having the SmA-less phase transition series suitably used in the present invention, as shown in FIG. 7B, the liquid crystal molecules 14 are oriented in the phase transition from Ch to SmC* so that they are tilted from the layer normal direction LN but aligned with a side of the virtual cone 15 which is coincident with the average uniaxial aligning treatment axis direction R, thus forming a smectic layer structure. In this state, a constraint force becomes larger due to the uniaxial aligning treatment. As a result, only one of these two states is (mono-)stabilized, whereby a memory characteristic (bistability) of the liquid crystal is lost.

In the case of the liquid crystal having the phase transition series as shown in FIG. 7B, the tilt angle in SmC* of the liquid crystal charges with temperature and abruptly increases at the time of phase transition from Ch to SmC* and then gradually changes with temperature. The change in tilt angle with temperature means a change in (smectic) layer normal direction LN with temperature. More specifically, an angle formed between one of two sides of the cone 15 and the layer normal direction LN coincides with half o an apex angle, i.e., the tilt angle. Accordingly, the layer normal direction LN rotates relative to the uniaxial aligning treatment axis direction R so as to correspond to the temperature change of the tilt angle.

In this regard, in the case where smectic molecular layers are not completely formed to provide the liquid crystal with a sufficiently low viscosity and the rotation of the layer normal direction LN is completed in a sufficiently short time, (smectic) liquid crystal molecules presumably follow the rotation of the layer normal direction LN.

On the other hand if the tilt angle is changed when the formation of smectic molecular layers is completed to increase the liquid crystal viscosity, it may be considered that a large stress against the change accompanied with the layer rotation is caused as a whole. This means that the stable position of the liquid crystal molecules which has been coincident with the average uniaxial aligning treatment axis direction R is deviated therefrom with a changing tilt angle.

In other words, with the temperature change of the tilt angle the stable position of the liquid crystal molecules has a distribution corresponding to a changed degree of the tilt angle ($\widehat{H}$, exactly a changed degree of the tilt angle from a time when the layer rotation is not readily caused due to an insufficient energy therefor). This also means that the smectic layer normal direction has a similar distribution.

As a result of our study, it has been clarified that a large lowering in contrast is presumably caused due to a degree of such a distribution for the tilt angle (and also the layer normal direction LN).

According to our study, at a temperature immediately below the phase transition temperature to SmC* (Tc), particularly in a temperature range from Tc (°C.) to Tc−1 (°C.), it has been confirmed that an orientation (alignment) of liquid crystal molecules sufficiently follows the change of the tilt angle since in the temperature range, smectic (molecular) layers are in an intermediate state of layer formation (an insufficient layer formation state immediately after a state of not forming smectic layers) and have a sufficiently low viscosity.

Hereinbelow, the present invention will be described more specifically based on Examples.

EXAMPLE 1

A liquid crystal (panel) P shown in FIGS. 1 and 4 was prepared in the following manner.

A pair of 1.1 mm-thick glass substrates 1a and 1b provided with 700 Å-thick common and pixel electrodes of ITO film was provided.

With respect to the glass substrate 1b, the substrate 1b was formed in an active matrix substrate provided with a plurality of a-Si TFTs and a silicon nitride (gate insulating) film.

On each of the common and pixel electrodes 3a and 3b (of the pair of glass substrates 1a and 1b), a polyimide precursor for forming a polyimide having a recurring unit shown below was applied by spin coating and pre-dried at 80° C. for 5 min., followed by hot-baking at 200° C. for 1 hour to obtain a 200 Å-thick polyimide (alignment control) film.

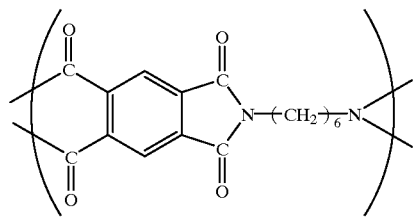

Each of the thus-obtained polyimide film was subjected to rubbing treatment (as a uniaxial aligning treatment) with a nylon cloth under the following conditions to provide an alignment control film 6a (6b).

Rubbing roller: a 10 cm-dia. roller about which a nylon cloth ("NF-77", mfd. by Teijin K. K.) was wound.
Pressing depth: 0.3 mm
Substrate feed rate: 10 cm/sec
Rotation speed: 1000 rpm
Substrate feed: 4 times Then, on the substrate 1a, silica beads (average particle size=1.4 μm) were dispersed and the pair of substrates were applied to each other so that the rubbing treating axes were in parallel with each other and in the same direction (parallel relationship), thus preparing a blank cell.

A liquid crystal composition LC-1 as a chiral smectic liquid crystal 2 was prepared by blending the following mesomorphic (liquid crystal) compounds in the indicated proportions.

| Structural formula | wt. parts |
|---|---|
| $C_6H_{13}$—[pyrimidine]—[phenyl]—$OC_{10}H_{21}$ | 11.55 |
| $C_{10}H_{21}$—[pyrimidine]—[phenyl]—$OC_8H_{17}$ | 11.55 |
| $C_8H_{17}$—[pyrimidine]—[phenyl]—$O\underset{\underset{O}{\|}}{C}C_7H_{15}$ | 7.70 |
| $C_8H_{17}$—[pyrimidine]—[phenyl]—$O\underset{\underset{O}{\|}}{C}C_6H_{13}$ | 7.70 |
| $C_9H_{19}$—[pyrimidine]—[phenyl]—$O\underset{\underset{O}{\|}}{C}C_7H_{15}$ | 7.70 |
| $C_6H_{13}$—[pyrimidine]—[phenyl]—[phenyl]—$C_5H_{11}$ | 9.90 |
| $C_6H_{13}$—[pyrimidine]—[phenyl]—[phenyl]—$C_7H_{15}$ | 9.90 |

| Structural formula | wt. parts |
|---|---|
| C₁₁H₂₃—[pyrimidine]—[phenyl]—O—C(=O)—[thiophene]—C₄H₉ | 30.0 |
| C₁₀H₂₁—[pyrimidine]—[phenyl]—OCH₂CHC₈H₁₇ (F, *) | 4.00 |

The thus-prepared liquid crystal composition LC-1 showed the following phase transition series.
Phase Transition Temperature (°C.)

$$\text{Iso} \xleftarrow{86} \text{Ch} \xleftarrow{61} \text{SmC*} \xleftarrow{-7} \text{Cry}$$

(Iso: isotropic phase, Ch: cholesteric phase, SmC*: chiral smectic phase, Cry: crystal phase) The liquid crystal composition LC-1 was injected into the above-prepared blank cell in its isotropic liquid state and gradually cooled to a temperature providing chiral smectic C phase at a rate of 20° C./hour to prepare a liquid crystal device P1.

In the above cooling step, the liquid crystal device P1 was subjected to a voltage application treatment such that a DC (offset) voltage of −5 volts was applied in a temperature range of Tc ±2° C. (Tc: SmC*-Ch phase transition temperature) while cooling each device at a rate of 1° C./min. The liquid crystal device P1 showed a cell gap of ca. 1.4 μm as measured by using the Berek compensator.

The thus-prepared liquid crystal device P1 was evaluated in the following manner in terms of alignment state, optical response characteristics for triangular wave and rectangular wave, and a correlation between tilt angle and contrast, respectively.
<Alignment State>

The alignment state of the liquid crystal composition LC-1 of the liquid crystal device P1 was observed through a polarizing microscope at 30° C. (room temperature) under no voltage application.

As a result, a substantially uniform alignment state such that the darkest (optical) axis was somewhat deviated from the rubbing direction and only one layer normal direction was substantially present over the entire liquid crystal device P1 was observed.
<Optical Response to Triangular Wave>

The liquid crystal device P1 was set in a polarizing microscope equipped with a photomultiplier under cross nicol relationship so that a polarizing axis was disposed to provide the darkest state under no voltage application.

When the liquid crystal device P1 was supplied with a triangular wave (±5 volts, 0.2 Hz) at 30° C., a resultant transmitted light quantity (transmittance) was gradually and continuously increased with the magnitude (absolute value) of the applied voltage under application of the positive-polarity voltage. On the other hand, under application of the negative-polarity voltage, a resultant transmitted light quantity was changed with the applied voltage level but a maximum value of the transmittance was ca. 1/10 of a maximum transmittance in the case of the positive-polarity voltage application.
<Optical Response to Rectangular Wave>

The optical response was evaluated in the same manner as in the above case of using the triangular wave except for using a rectangular wave (±5 volts, 60 Hz) in place of the triangular wave.

As a result, under application of the positive-polarity voltage, the liquid crystal composition LC-1 was found to exhibit a sufficient optical response thereto and provide a stable halftone (intermediate) state independent of a previous state. Further, also under application of the negative-polarity voltage, an optical response (in terms of transmittance) was confirmed similarly as in the case of the positive-polarity application but the value thereof was ca. 1/10 of that in the case of the positive-polarity voltage application when compared at an identical absolute value of the voltages. It was also confirmed that an average value of the resultant transmittance did not depend on that in their previous states, thus attaining a good halftone image display.

<Correlation Between Tilt Angle and Contrast>

The liquid crystal device P1 was supplied with a rectangular wave (100 Hz, Vpp (peak-to-peak voltage)=25 V) to measure a tilt angle at three temperature (Tc−1 (°C.), Tc−10 (°C.) and Tc−30 (°C.), and was supplied with a rectangular wave (60 Hz, Vpp=20 V) to measure a contrast at the three temperatures.

The results are shown in Table 1.

TABLE 1

| Temp. (° C.) | Tilt angle (deg.) | Contrast |
|---|---|---|
| Tc − 1 | $(H)_1 = 18.5$ | — |
| Tc − 10 | $(H)_{10} = 22.1$ | 119 |
| Tc − 30 | $(H)_{30} = 23.3$ | 94 |

Accordingly, in this example, $(H)_{10}-(H)_1 = 3.6 < 4.0$ (deg.) and $(H)_{30}-(H)_{10} = 1.2 < 2.0$ (deg.). Further, a difference in contrast between at Tc−10 (°C.) at Tc−30 (°C.) was 25.

As apparent from the above results, the liquid crystal device P1 according to the present invention provided a high contrast.

EXAMPLE 2

A liquid crystal device P2 was prepared and evaluated in the same manner as in Example 1 except that the liquid crystal composition LC-1 was changed to a liquid crystal composition LC-2 prepared by blending the following compounds in the indicated proportions.

| Structural formula | wt. parts |
|---|---|
| 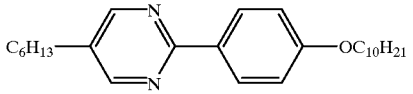 | 7.50 |
| 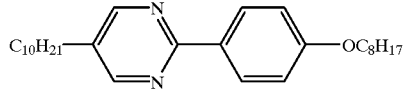 | 7.50 |
| 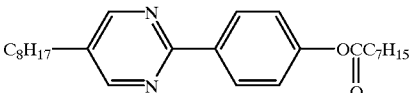 | 5.00 |
| 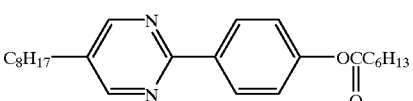 | 5.00 |
| 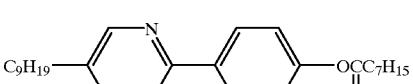 | 5.00 |
|  | 13.12 |
|  | 13.12 |
| 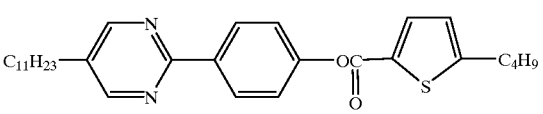 | 39.76 |
| 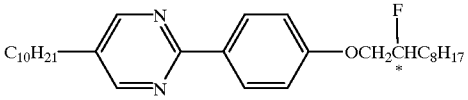 | 4.00 |

The thus-prepared liquid crystal composition LC-2 showed the following phase transition series.

Phase Transition Temperature (°C.)

$$\text{Iso} \xleftarrow{97} \text{Ch} \xleftarrow{63} \text{SmC*} \xleftarrow{7} \text{Cry}$$

<Alignment State>

Similarly as in Example 1, a substantially uniform alignment state such that the darkest (optical) axis was somewhat deviated from the rubbing direction and only one layer normal direction was substantially present over the entire liquid crystal device P2 was observed.

<Optical Response to Triangular Wave and Rectangular Wave>

The results were similar to those obtained in Example 1, respectively.

<Correlation Between Tilt Angle and Contrast>

The results are shown in Table 2.

TABLE 2

| Temp. (° C.) | Tilt angle (deg.) | Contrast |
|---|---|---|
| Tc - 1 | $(H)_1 = 21.1$ | — |
| Tc - 10 | $(H)_{10} = 23.7$ | 147 |
| Tc - 30 | $(H)_{30} = 24.7$ | 146 |

Accordingly, in this example, $(H)_{10} - (H)_1 = 3.0 < 4.0$ (deg.) and $(H)_{30} - (H)_{10} = 1.0 < 2.0$ (deg.). Further, a difference in contrast between at Tc−10 (°C.) and at Tc−(°C.) 30 was 25.

As apparent from the above results, the liquid crystal device P2 according to the present invention provided a high contrast.

EXAMPLE 3

A liquid crystal device P3 was prepared and evaluated in the same manner as in Example 1 except that the liquid crystal composition LC-1 was changed to a liquid crystal composition LC-3 prepared by blending the following compounds in the indicated proportions.

| Structural formula | wt. parts |
|---|---|
|  | 14.78 |
|  | 14.78 |
|  | 9.85 |
|  | 9.85 |
|  | 9.85 |
|  | 26.88 |
|  | 10.00 |
|  | 4.00 |

The thus-prepared liquid crystal composition LC-3 showed the following phase transition series.
Phase Transition Temperature (°C.)

$$\text{Iso} \xleftarrow{72} \text{Ch} \xleftarrow{55} \text{SmC*} \xleftarrow{1} \text{Cry}$$

<Alignment State>
Similarly as in Example 1, a substantially uniform alignment state such that the darkest (optical) axis was somewhat deviated from the rubbing direction and only one layer normal direction was substantially present over the entire liquid crystal device P3 was observed.
<Optical Response to Triangular Wave and Rectangular Wave>

The results were similar to those obtained in Example 1, respectively.

<Correlation Between Tilt Angle and Contrast>

The results are shown in Table 3.

TABLE 3

| Temp. (° C.) | Tilt angle (deg.) | Contrast |
|---|---|---|
| Tc - 1 | $(H)_1$ = 19.0 | — |
| Tc - 10 | $(H)_{10}$ = 21.8 | 156 |
| Tc - 30 | $(H)_{30}$ = 24.0 | 110 |

Accordingly, in this example, $(H)_{10} - (H)_1 = 2.8 < 4.0$ (deg.) but $(H)_{30} - (H)_{10} = 2.2 > 2.0$ (deg.). Further, a difference in contrast between at Tc–10 (°C.) and at Tc–30 (°C.) was 46.

As apparent from the above results, the liquid crystal device P3 according to the present invention provided a high contrast at high temperatures (e.g., Tc–10 (°C.)). The contrast was considerably decreased at Tc–30 (°C.) but the value of 110 was still higher than 100, thus being of a practically acceptable level.

Comparative Example 1

A liquid crystal device P4 was prepared and evaluated in the same manner as in Example 1 except that the liquid crystal composition LC-1 was changed to a liquid crystal composition LC-4 prepared by blending the following compounds in the indicated proportions.

| Structural formula | wt. parts |
| --- | --- |
| $C_6H_{13}$—pyrimidine—phenyl—$OC_{10}H_{21}$ | 11.55 |
| $C_{10}H_{21}$—pyrimidine—phenyl—$OC_8H_{17}$ | 11.55 |
| $C_8H_{17}$—pyrimidine—phenyl—$OC(=O)C_7H_{15}$ | 7.70 |
| $C_8H_{17}$—pyrimidine—phenyl—$OC(=O)C_6H_{13}$ | 7.70 |
| $C_9H_{19}$—pyrimidine—phenyl—$OC(=O)C_7H_{15}$ | 7.70 |
| $C_6H_{13}$—pyrimidine—phenyl—phenyl—$C_5H_{11}$ | 9.90 |
| $C_6H_{13}$—pyrimidine—phenyl—phenyl—$C_7H_{15}$ | 9.90 |
| $C_6H_{13}$—pyrimidine—phenyl—(2,3-difluoro)phenyl—$C_5H_{11}$ | 10.00 |
| $C_6H_{13}$—pyrimidine—phenyl—(2,3-difluoro)phenyl—$C_6H_{13}$ | 10.00 |
| $C_6H_{13}$—pyrimidine—phenyl—(2,3-difluoro)phenyl—$C_8H_{17}$ | 10.00 |

| Structural formula | wt. parts |
|---|---|
| 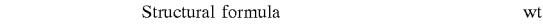 | 4.00 |

The thus-prepared liquid crystal composition LC-4 showed the following phase transition series.
Phase Transition Temperature (°C.)

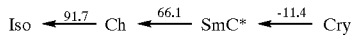

<Alignment State>

Similarly as in Example 1, a substantially uniform alignment state such that the darkest (optical) axis was somewhat deviated from the rubbing direction and only one layer normal direction was substantially present over the entire liquid crystal device P4 was observed.

<Optical Response to Triangular Wave and Rectangular Wave>

The results were similar to those obtained in Example 1, respectively.

<Correlation Between Tilt Angle and Contrast>

The results are shown in Table 4.

TABLE 4

| Temp. (° C.) | Tilt angle (deg.) | Contrast |
|---|---|---|
| Tc − 1 | $\widehat{H}_1$ = 21.3 | — |
| Tc − 10 | $\widehat{H}_{10}$ = 25.4 | 80 |
| Tc − 30 | $\widehat{H}_{30}$ = 29.0 | 28 |

Accordingly, in this example, $\widehat{H}_{10}-\widehat{H}_1=4.1>4.0$ (deg.) and $\widehat{H}_{30}-\widehat{H}_{10}=3.6>2.0$ (deg.). Further, a difference in contrast between at Tc−10 (°C.) and at Tc−30 (°C.) was 52.

As apparent from the above results, the liquid crystal device P4 according to the present invention provided a low contrast at high temperatures (e.g., Tc−10 (°C.)). The contrast was considerably decreased at Tc−30 (°C.) and the value of 128 was remarkably lower level, thus being of a practically unacceptable level.

As described hereinabove, according to the present invention, by using the chiral smectic liquid crystal having a temperature-dependent tilt angle characteristic in SmC* such that a change in tilt angle with temperature is considerably small, i.e., $\widehat{H}_{10}-\widehat{H}_1 \leq 4.0$ deg, preferably $\widehat{H}_{30}-\widehat{H}_{10} \leq 2.0$ deg, it becomes possible to realize a high contrast.

Further, the chiral smectic liquid crystal has such an alignment characteristic that a tilting angle from a monostable position of an average molecular axis continuously changed depending on magnitude of a voltage applied to the chiral smectic liquid crystal under application of voltages of a polarity (+ or −), so that it is possible to effect gradational display of resultant images by applying voltages corresponding to gradational levels to be displayed to the chiral smectic liquid crystal.

Further, according to the driving method of the present invention, each frame period is divided into at least one field period for displaying a higher luminance image and at least one field period for displaying a lower luminance image, resultant image qualities for motion picture display are improved and a higher luminance is obtained when compared with the conventional case where a non-image display period is set between a still image display period and a subsequent still image display period. As a result, the driving method of the present invention does not require complicated driving operation and peripheral circuit, thus preventing an increase in total production cost.

What is claimed is:

1. A liquid crystal device, comprising:

a chiral smectic liquid crystal, and a pair of substrates having thereon electrodes for applying a voltage to the chiral smectic liquid crystal and disposed to sandwich the chiral smectic liquid crystal to form a plurality of pixels, wherein the chiral smectic liquid crystal has a temperature-dependent tilt angle characteristic satisfying the following relationship:

$\widehat{H}_{10}-\widehat{H}_1 \leq 4.0$ degrees, wherein $\widehat{H}_{10}$ denotes a tilt angle at a temperature which is 10° C. lower than an upper limit temperature of chiral smectic C phase and $\widehat{H}_1$ denotes a tilt angle at a temperature which is 1° C. lower than the upper limit temperature, and the liquid crystal has an alignment characteristic such that the liquid crystal is aligned to provide an average molecular axis to be placed in a monostable alignment state under no voltage application, is tilted from the monostable alignment state in one direction when supplied with a voltage of a first polarity at a tilting angle which varies depending on magnitude of the supplied voltage, and is tilted from the monostable alignment state in the other direction when supplied with a voltage of a second polarity opposite to the first polarity at a tilting angle, said tilting angles providing maximum tilting angles formed under application of the voltages of the first and second polarities, respectively, different from each other, and one of said tilting angles continuously changing depending on magnitude of the supplied voltage of the first polarity or the second polarity.

2. A device according to claim 1, herein said tilt angle which changes with temperature in chiral smectic C phase satisfies the following relationship:

$\widehat{H}_{10}-\widehat{H}_{10} \leq 2.0$ degrees, wherein $\widehat{H}_{30}$ denotes a tilt angle at a temperature which is 10° C. lower than an upper limit temperature.

3. A device according to claim 1 or 2, wherein the chiral smectic liquid crystal is a liquid crystal composition comprising at least two compounds one of which is a compound represented by the following formula (I):

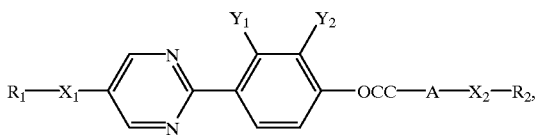

wherein A denotes

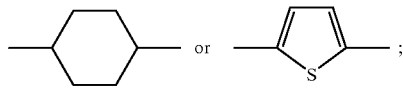

$R_1$ and $R_2$ are independently a linear or branched alkyl group having 1–20 carbon atoms optionally having a substituent; $X_1$ and $X_2$ are independently a single bond, O, COO or OOC; and $Y_1$ and $Y_2$ are independently H or F.

4. A device according to claim 3, wherein the liquid crystal composition comprises at least one species of the compound of the formula (I) in an amount of at least 20 wt. %.

5. A device according to claim 1, wherein the liquid crystal shows a phase transition on temperature decrease including isotropic liquid phase (Iso), cholesteric phase (Ch) and chiral smectic C phase (SmC*) or isotropic liquid phase (Iso) and chiral smectic C phase (SmC*) and provide a layer normal direction of its smectic molecular layers substantially aligned in one direction in SmC*.

6. A device according to claim 1, which has a cell thickness which is at most half of a helical pitch of the liquid crystal in its bulk state.

7. A device according to claim 1, wherein the liquid crystal device is provided with a plurality of active elements each for a pixel electrically connected with an associated electrode of the electrodes on the substrate.

8. A device according to claim 1, wherein the liquid crystal device is of a transmission-type.

9. A device according to claim 1, wherein the liquid crystal device is of a reflection-type.

10. A method of driving a liquid crystal device according to claim 1, comprising:

applying a voltage corresponding to a gradational display level to the chiral smectic liquid crystal.

11. A method of driving a liquid crystal device according to claim 1, comprising:

driving one frame period into a plurality of field periods, displaying a higher luminance image in at least one field period and a lower luminance image in at least one field period.

* * * * *

UNITED STATES PATENT AND TRADEMARK OFFICE
CERTIFICATE OF CORRECTION

PATENT NO. : 6,420,000 B1
DATED : July 16, 2002
INVENTOR(S) : Shinichi Nakamura et al.

It is certified that error appears in the above-identified patent and that said Letters Patent is hereby corrected as shown below:

<u>Title page,</u>
Item [74], insert:
-- [74] *Attorney, Agent or Firm*—Fitzpatrick, Cella, Harper & Scinto— --.
Item [57], ABSTRACT,
Line 21, "other,and" should read -- other, and --.

<u>Column 2,</u>
Line 13, "(a" should read -- (as --;
Line 65, "other,and" should read -- other, and --.

<u>Column 6,</u>
Line 7, "R$_2$" should read -- R$_2$, --.

<u>Column 9,</u>
Line 28, "poly crystalline-Si" should read -- polycrystalline-Si --.

<u>Column 11,</u>
Line 2, "are" should read -- is --.

<u>Column 12,</u>
Line 34, "o" should read -- of --.

<u>Column 14,</u>
Line 10, "film" should read -- films --.

<u>Column 16,</u>
Line 37, "temperature" should read -- temperatures --;
Line 54, "(°C.) at" should read -- (°C.) and at --.

<u>Column 19,</u>
Line 23,

<u>Column 23,</u>
Line 39, "Ⓗ$_{10}$-Ⓗ$_{10}$" should read --Ⓗ$_{30}$-Ⓗ$_{10}$--.

UNITED STATES PATENT AND TRADEMARK OFFICE
CERTIFICATE OF CORRECTION

PATENT NO. : 6,420,000 B1
DATED : July 16, 2002
INVENTOR(S) : Shinichi Nakamura et al.

It is certified that error appears in the above-identified patent and that said Letters Patent is hereby corrected as shown below:

<u>Column 24,</u>
Line 55, "herein" should read -- wherein --.
Line 59, "$(H)_{10}\text{-}(H)_{10} \leqq 2.0$ degrees," should read --$(H)_{30}\text{-}(H)_{10} \leqq 2.0$ degrees,--.

<u>Column 26,</u>
Line 2, "provide" should read -- provides --;
Line 22, "driving" should read -- dividing --.

Signed and Sealed this

First Day of April, 2003

JAMES E. ROGAN
*Director of the United States Patent and Trademark Office*